(12) United States Patent
Baughman et al.

(10) Patent No.: US 12,567,216 B2
(45) Date of Patent: Mar. 3, 2026

(54) AUGMENTED-REALITY-INTERFACE CONFLATION IDENTIFICATION

(71) Applicant: International Business Machines Corporation, Armonk, NY (US)

(72) Inventors: Aaron K. Baughman, Cary, NC (US); Eduardo Morales, Key Biscayne, FL (US); Rahul Agarwal, Jersey City, NJ (US); Chandankumar Johakhim Patel, Fairborn, OH (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 18/199,799

(22) Filed: May 19, 2023

(65) Prior Publication Data

US 2024/0386674 A1    Nov. 21, 2024

(51) Int. Cl.
    *G06T 19/00*    (2011.01)
    *G06T 7/00*    (2017.01)

(52) U.S. Cl.
    CPC ............. *G06T 19/006* (2013.01); *G06T 7/97* (2017.01); *G06T 2207/20084* (2013.01)

(58) Field of Classification Search
    CPC  G06T 19/006; G06T 7/97; G06T 2207/20084
    See application file for complete search history.

(56) References Cited

U.S. PATENT DOCUMENTS 10,142,276 B2   11/2018  Rapaport et al.
11,029,762 B2 *  6/2021  Doornenbal  ........ G06F 3/04815
(Continued)

FOREIGN PATENT DOCUMENTS

CN      111213184 A  *  5/2020  .............. G06F 3/011
EP       3916635 A1 *  12/2021  ......... G06F 18/2148
(Continued)

OTHER PUBLICATIONS

Rafi, Automatic Oracle Prediction of Object Placements in Augmented Reality Testing. In 37th IEEE/ACM International Conference on Automated Software Engineering (ASE '22), Oct. 10-14, 2022, Rochester, MI, USA. ACM, New York, NY, USA, 13 pages. https://doi.org/10.1145/3551349.3561160 (Year: 2022).*
(Continued)

*Primary Examiner* — Jason Chan
*Assistant Examiner* — Snigdha Sinha
(74) *Attorney, Agent, or Firm* — Kelsey M. Skodje

(57)           ABSTRACT

A method for detecting conflation errors in an augmented reality interface is disclosed. In one embodiment, such a method includes receiving an actual screenshot of an augmented reality interface. The method generates, using a generative adversarial network (GAN), a replica screenshot of the augmented reality interface that indicates how the actual screenshot is expected to appear. The replica screenshot is non-identical to the actual screenshot. The method receives the actual screenshot and the replica screenshot into a fractal-based convolutional neural network (CNN) to determine a correlation between the actual screenshot and the replica screenshot. In the event the correlation is below a designated threshold, the method flags the actual screenshot as having a potential conflation error. This conflation error may involve conflating a digital component for a physical component or vice versa. A corresponding system and computer program product are also disclosed.

20 Claims, 10 Drawing Sheets

(56) References Cited

U.S. PATENT DOCUMENTS

| | | | |
|---|---|---|---|
| 11,087,554 | B2 | 8/2021 | Walton |
| 11,429,618 | B2 * | 8/2022 | Pounds ............... G06F 16/2477 |
| 2013/0162633 | A1 * | 6/2013 | Berger ..................... G09G 5/00 |
| | | | 345/582 |
| 2017/0221270 | A1 | 8/2017 | Goslin et al. |
| 2019/0073832 | A1 * | 3/2019 | Kim ...................... G06T 19/003 |
| 2019/0317739 | A1 | 10/2019 | Turek et al. |
| 2021/0335011 | A1 | 10/2021 | Araújo et al. |
| 2022/0300557 | A1 * | 9/2022 | Basu ................... G06F 16/9027 |
| 2024/0078659 | A1 * | 3/2024 | Ofir ......................... G06T 7/001 |

FOREIGN PATENT DOCUMENTS

| | | | | |
|---|---|---|---|---|
| KR | 102602513 | B1 * | 11/2023 | ........... G06T 19/006 |
| KR | 20240075181 | A * | 5/2024 | ........... G06T 19/006 |
| WO | 2020/104027 | A1 | 5/2020 | |

OTHER PUBLICATIONS

Gomez, Javier-Flavio Vigueras, et al. "Calibration Errors in Augmented Reality: a Practical Study," Fourth IEEE and ACM International Symposium on Mixed and Augmented Reality (ISMAR'05), Oct. 2005.

Georgel, P. et al. "An Industrial Augmented Reality Solution for Discrepancy Check," 2007 6th IEEE and ACM International Symposium on Mixed and Augmented Reality, Oct. 2007.

Blum, T. et al. "Advanced Training Methods using an Augmented Reality Ultrasound Simulator," 2009 8th IEEE International Symposium on Mixed and Augmented Reality, Oct. 2009.

Eck, Ulrich, et al. "Exploring the Perception of Co-Location Errors during Tool Interaction in Visuo-Haptic Augmented Reality," 2016 IEEE Virtual Reality (VR), Mar. 2016.

Wang, J., et al. "Prioritization and Static Error Compensation for Multi-camera Collaborative Tracking in Augmented Reality," 2017 IEEE Virtual Reality (VR), Mar. 2017.

Pankratz, F., et al. "User Awareness of Tracking Uncertainties in AR Navigation Scenarios," 2013 IEEE International Symposium on Mixed and Augmented Reality (ISMAR), Oct. 2013.

M. Bajura and U. Neumann. "Dynamic Compensation of Alignment Error in Augmented-Reality Systems." In IEEE VRAIS, vol. 95, pp. 189-196, 1995.

N. Gajjar and V. Pandian, "Akin: Generating UI Wireframes From UI Design Patterns Using Deep Learning," Nov. 26, 2022, [AccessedMar. 1, 2023], https://github.com/vinothpandian/akin-generator.

T. Höllerer et al., "User interface management techniques for collaborative mobile augmented reality," Computers & Graphics, 25(5), pp. 799-810, 2001.

T. Li et al., "Efficient method to evaluate misalignment between virtual and real objects for AR-based assembly assistance system." Proc. JSPE Semestrial Meeting 2020 JSPE Spring Conference, pp. 224-225. 2020.

X. Yao et al., "An Automatic GUI Generation Method Based on Generative Adversarial Network." Proc. Seventh Internat. Congress on Information and Communication Technology: ICICT 2022, London, vol. 3., 2022.

* cited by examiner

100

Computer 101

Processor Set 110

| Processing Circuitry 120 | Cache 121 |

Communication Fabric 111

Volatile Memory 112

Persistent Storage 113

| Operating System 122 | Conflation Identification Module 150 |

Peripheral Device Set 114

| UI Device Set 123 | Storage 124 | IoT Sensor Set 125 |

Network Module 115

WAN 102

End User Device 103

Remote Server 104

Remote Database 130

Private Cloud 106

Gateway 140

Public Cloud 105

| Cloud Orchestration Module 141 | Host Physical Machine Set 142 |
| Virtual Machine Set 143 | Container Set 144 |

Hidden Layer, h fixed fixed  fixed fixed

Visible Layer, v

700a

700b

```
from pytorch_forecasting.data import (
        TimeSeriesDataSet,
        GroupNormalizer
)max_prediction_length = 6 # forecast 6 months
max_encoder_length = 24 # use 24 months of history
training_cutoff = data["time_idx"].max() -
max_prediction_lengthtraining = TimeSeriesDataSet(
        data[lambda x: x.time_idx <= training_cutoff],
        time_idx="time_idx",
        target="volume",
        group_ids=["agency", "sku"],
        min_encoder_length=0, # allow predictions without history
        max_encoder_length=max_encoder_length,
        min_prediction_length=1,
        max_prediction_length=max_prediction_length,
        static_categoricals=["agency", "sku"],
        static_reals=[
                "avg_population_2017",
                "avg_yearly_household_income_2017"
        ],
        time_varying_known_categoricals=["special_days", "month"],
        # group of categorical variables can be treated as
        # one variable
        variable_groups={"special_days": special_days},
        time_varying_known_reals=[
                "time_idx",
                "price_regular",
                "discount_in_percent"
        ],
        time_varying_unknown_categoricals=[],
        time_varying_unknown_reals=[
                "volume",
                "log_volume",
                "industry_volume",
                "soda_volume",
                "avg_max_temp",
                "avg_volume_by_agency",
                "avg_volume_by_sku",
        ],
```

Fig. 8A

```
target_normalizer=GroupNormalizer(
        groups=["agency", "sku"], coerce_positive=1.0
), # use softplus with beta=1.0 and normalize by group
add_relative_time_idx=True, # add as feature
add_target_scales=True, # add as feature
add_encoder_length=True, # add as feature
)# create validation set (predict=True) which means to predict
the
# last max_prediction_length points in time for each series
validation = TimeSeriesDataSet.from_dataset(
        training, data, predict=True, stop_randomization=True
)# create dataloaders for model
batch_size = 128
train_dataloader = training.to_dataloader(
        train=True, batch_size=batch_size, num_workers=0
)
val_dataloader = validation.to_dataloader(
        train=False, batch_size=batch_size * 10, num_workers=0
)
import pytorch_lightning as pl
from pytorch_lightning.callbacks import (
        EarlyStopping,
        LearningRateLogger
)
from pytorch_lightning.loggers import TensorBoardLogger
from pytorch_forecasting.metrics import QuantileLoss
from pytorch_forecasting.models import
TemporalFusionTransformer# stop training, when loss metric does
not improve on validation set
early_stop_callback = EarlyStopping(
        monitor="val_loss",
        min_delta=1e-4,
        patience=10,
        verbose=False,
        mode="min"
)
```

Fig. 8B

```
lr_logger = LearningRateLogger() # log the learning rate
logger = TensorBoardLogger("lightning_logs") # log to
tensorboard# create trainer
trainer = pl.Trainer(
        max_epochs=30,
        gpus=0, # train on CPU, use gpus = [0] to run on GPU
        gradient_clip_val=0.1,
        early_stop_callback=early_stop_callback,
        limit_train_batches=30, # running validation every 30
batches
        # fast_dev_run=True, # comment in to quickly check for bugs
        callbacks=[lr_logger],
        logger=logger,
)# initialise model
tft = TemporalFusionTransformer.from_dataset(
        training,
        learning_rate=0.03,
        hidden_size=16, # biggest influence network size
        attention_head_size=1,
        dropout=0.1,
        hidden_continuous_size=8,
        output_size=7, # QuantileLoss has 7 quantiles by default
        loss=QuantileLoss(),
        log_interval=10, # log example every 10 batches
        reduce_on_plateau_patience=4, # reduce learning
automatically
)
tft.size() # 29.6k parameters in model# fit network
trainer.fit(
        tft,
        train_dataloader=train_dataloader,
        val_dataloaders=val_dataloader
)
```

Fig. 8C

AUGMENTED-REALITY-INTERFACE CONFLATION IDENTIFICATION

BACKGROUND

Field of the Invention

This invention relates to augmented reality interfaces and more particularly to systems and methods for identifying conflation errors in augmented reality interfaces.

Background of the Invention

Augmented reality is becoming more pervasive as a means for enhancing real-world content with digital visual components and other computer-generated content. For example, in a sporting event, augmented reality may be used to overlay digital components or images onto a playing field or the players to provide additional information to a viewer. In other cases, augmented reality may be used to decorate real-world environments with virtual components such as virtual furniture or artwork before acquiring the corresponding physical assets. More advanced implementations of augmented reality may be interactive. For example, digital widgets or other components overlaid on a real-world environment may be moved, manipulated, and or selected by a user.

Nevertheless, bugs may be difficult to spot in augmented reality environments. For example, when digital components are overlaid on a real-world environment, conflation errors may occur that are difficult to detect and mitigate. Conflation errors may occur when there is a mismatch or confusion between physical and digital components. For example, a conflation error may occur when a digital component is mistaken to be part of the real world. When this occurs, interaction with the digital component may not be detected. In other cases, a conflation error may occur when a physical component is mistaken for a digital component. In such a case, interaction with the physical component may trigger unintended actions.

SUMMARY

The invention has been developed in response to the present state of the art and, in particular, in response to the problems and needs in the art that have not yet been fully solved by currently available systems and methods. Accordingly, systems and methods have been developed for detecting conflation errors in augmented reality interfaces. The features and advantages of the invention will become more fully apparent from the following description and appended claims, or may be learned by practice of the invention as set forth hereinafter.

Consistent with the foregoing, a method for detecting conflation errors in an augmented reality interface is disclosed. In one embodiment, such a method includes receiving an actual screenshot of an augmented reality interface. The method generates, using a generative adversarial network (GAN), a replica screenshot of the augmented reality interface that indicates how the actual screenshot is expected to appear. The replica screenshot is non-identical to the actual screenshot. The method receives the actual screenshot and the replica screenshot into a fractal-based convolutional neural network (CNN) to determine a correlation between the actual screenshot and the replica screenshot. In the event the correlation is below a designated threshold, the method flags the actual screenshot as having a potential conflation error. This conflation error may involve conflating a digital component for a physical component or vice versa.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 1 is a high-level block diagram showing one example of a computing system for use in implementing embodiments of the invention;

FIGS. 8A-8C shows sample code that uses the PyTorch machine-learning framework to implement the process illustrated in FIG. 2.

DETAILED DESCRIPTION

Figure 2:
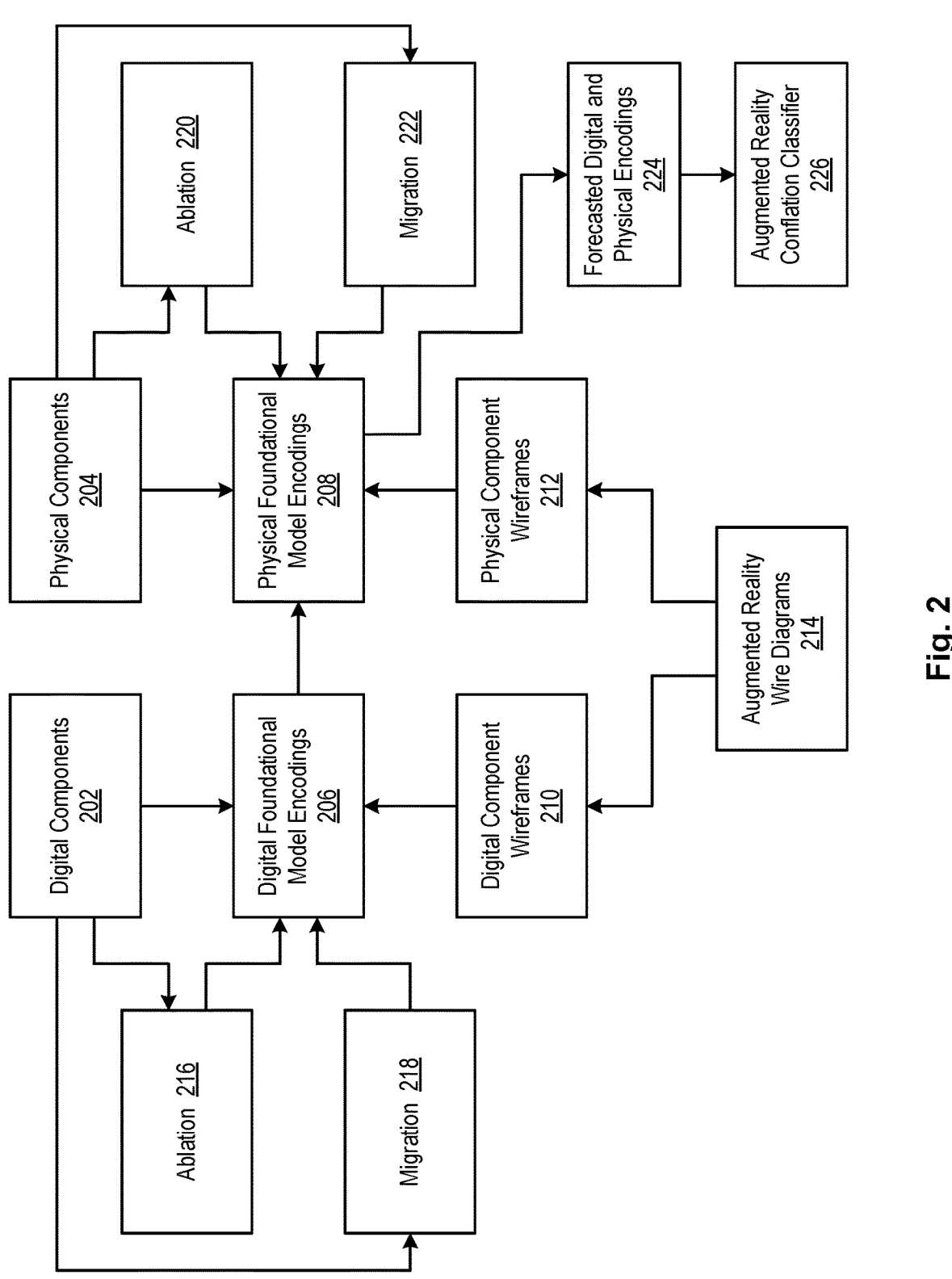
FIG. 2 is a high-level block diagram showing a process for dividing an augmented reality interface into distinct component classes, namely digital components and physical components, in order to create encodings (e.g., vector representations) that can be utilized to detect conflation errors.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 for detecting conflation errors in an augmented reality interface (i.e., collectively referred to herein as a "conflation identification module 150"). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, as previously mentioned, augmented reality is becoming more pervasive as a means for enhancing real-world content with digital visual components and other computer-generated content. Nevertheless, bugs may be difficult to spot in augmented reality environments. For example, when digital components are overlaid on a real-world environment, conflation errors may occur that are difficult to detect and mitigate. Conflation errors may occur when there is a mismatch or confusion between physical and digital components. For example, a conflation error may occur when a digital component is mistaken to be part of the real world. When this occurs, interaction with the digital component may not be detected. In other cases, a conflation error may occur when a physical component is mistaken for a digital component. In such a case, interaction with the physical component may trigger unintended actions.

Whenever a conflation error occurs, it is not likely to be reported back to a developer or system. There are typically several approaches put in place by developers to identify the conflation errors identified above. For example, if a conflation issue occurs, a user may report the issue by way of an email or chat. This approach requires significant user interaction. Unfortunately, there is no simple way to determine whether a conflation issue actually occurred. Thus, developers are typically blind with regard to how their augmented reality code is performing under different circumstances. In the rare circumstance a user does report a bug in an augmented reality interface, it may be too late to correct the issue since a scene may have already changed. Thus, systems and methods are needed to more efficiently and effectively identify and detect conflation errors in augmented reality interfaces so that bugs may be corrected.

FIG. 2 is a high-level block diagram showing a process for dividing an augmented reality interface into distinct component classes, namely digital components and physical components, in order to create encodings (e.g., vector representations) that can be utilized and processed to detect conflation errors. As shown, in order to accomplish this, an augmented reality interface may be divided into distinct component classes, namely digital components 202 and physical components 204. Digital components 202 may in certain embodiments be recognized by computer vision modules. A foundational model that acts as an encoder may learn the representation of the physical components 204 and/or wireframes of the physical components 204 to create physical foundation model encodings 208. For each recognized physical component 204, a corresponding set of digital components 202 may be recognized. A foundational model may also learn representations of the digital components 202 and/or wireframes of the digital components 202 to create digital foundational model encodings 206.

Each of the foundational model encodings 206, 208 may be time stamped. In sequence, encodings may then be created where digital and physical components 202, 204 are migrated 218, 222 (i.e., moved from one place to another within the augmented reality interface) and/or exchanged (i.e., having their locations exchanged within the augmented reality interface). The migration and exchange of components 202, 204 may be represented as encodings from foundational encoders from both the digital and physical spaces. The encodings may then be time stamped to match the original encoding time stamps.

Next, each digital and physical component 202, 204 may be ablated 216, 220 one at a time. Encodings may be created for each ablation 216, 220. When each encoding is time stamped, an encoding may be generated for each digital and physical component 202, 204 with the most user interactions. In other words, when performing ablations, the system 200 may loop over all digital and physical component 202, 204 but may do so in an order reflecting a number of interactions, thereby preferring to ablate digital and physical component 202, 204 that have a higher number or count of user interactions. These encodings may also be time stamped.

Each of the ablation, migration, and base encodings from the digital and physical worlds may then be appended together. That is, the encodings for the digital and physical component 202, 204 may be merged for later use in the process. This appending process may merge the encodings such that they are side-by-side without changing either of them (e.g., a list of [1, 2, 3] and a list of [5, 6, 7] may result in the appended list [1, 2, 3, 5, 6, 7]). The appended encodings, which may be chronologically ordered in a time series according to their time stamps, may then be forecast into the future to generate forecasted digital and physical encodings 224. FIGS. 8A-8C show sample code that uses the PyTorch machine-learning framework to implement the process illustrated in FIG. 2.

Figure 3:
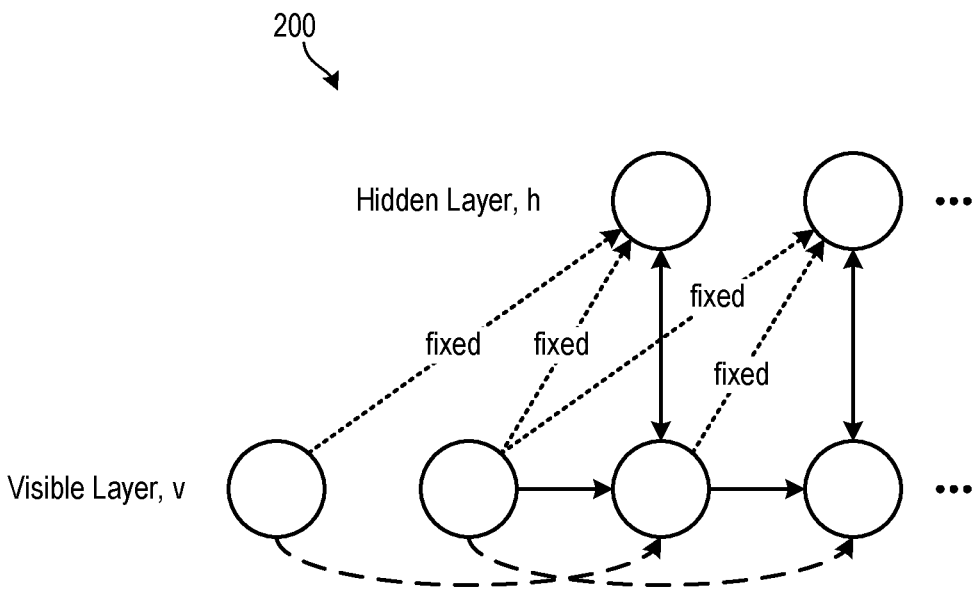
FIG. 3 is a high-level block diagram showing one example of neural network that may be used to implement a conflation classifier in accordance with the invention.

Next, an augmented reality conflation classifier 226 may be applied to the encodings that were generated and appended together in order to recognize conflation errors in the encodings. The conflation classifier 226 may accept multiple encodings and feed them across the same layer and hidden nodes. FIG. 3 is a high-level block diagram showing one example of neural network 200 that may be used to implement a conflation classifier 226 in accordance with the invention. The visible layers of the conflation classifier 226 accept inputs based on time incrementally increasing. The output of the conflation classifier 226 may be used to determine the confidence with which a conflation error exists.

Figure 4:
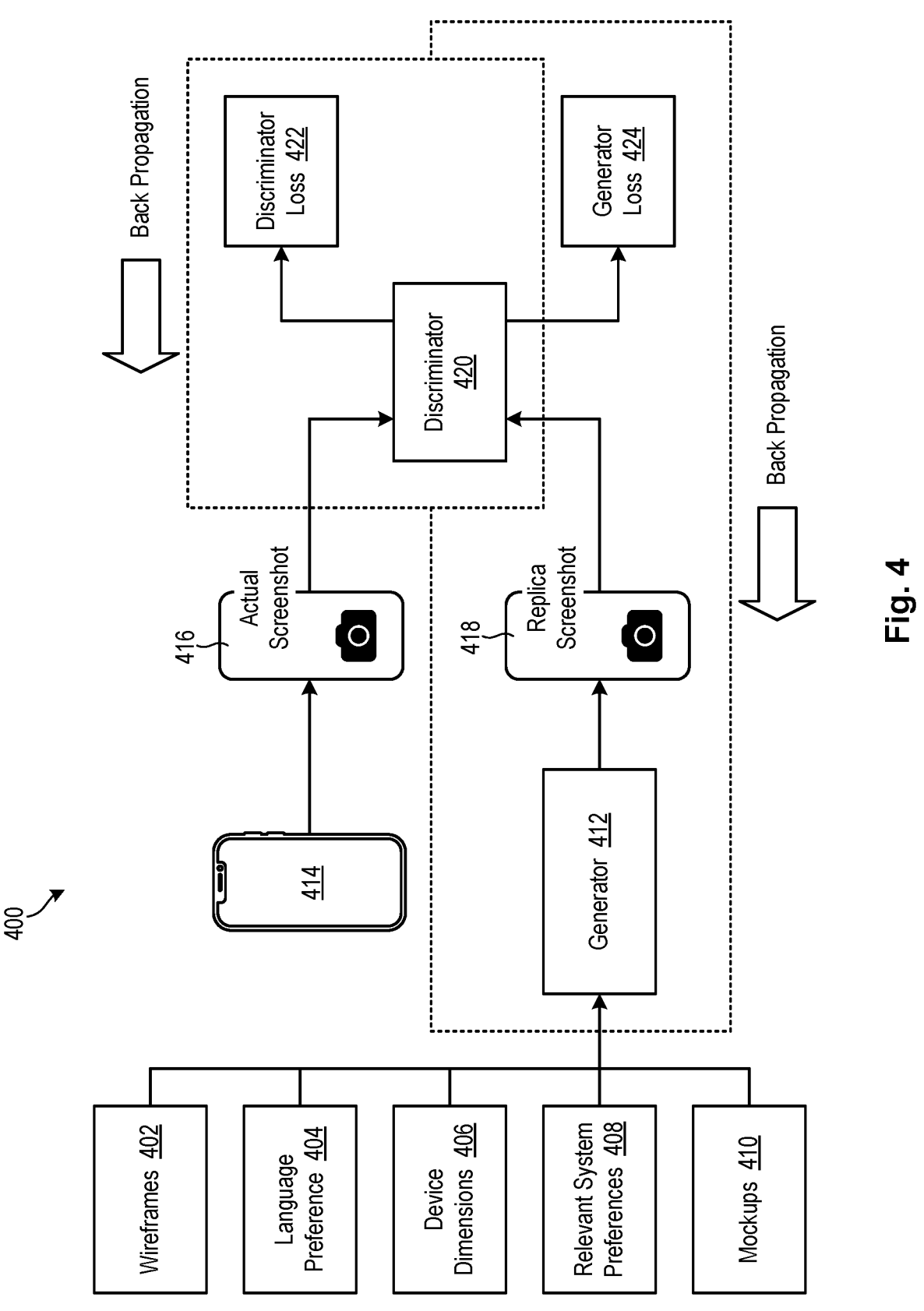
FIG. 4 is a high-level block diagram showing a generative adversarial network (GAN) used to generate a replica screenshot.

Referring to FIG. 4, in order to determine correlation between screenshots of an augmented reality interface and thereby identify potential conflation errors, a generative adversarial network (GAN) with various inputs may be used to generate a replica screenshot indicating how the augmented reality interface is expected to appear. The replica screenshot may be generated in accordance with device and design patterns, which may include for example device operating system, screen size, notch dimensions, language, dark/light mode, user interface wireframes and mockups, user interface tree structure such as HTML, XML, CSS, and screenshots and screen recordings of a user interface on pre-tested devices.

The GAN may be used to generate a replica screenshot that is almost identical to an actual screenshot. This replica screenshot may indicate how the augmented reality interface should look. FIG. 4 is a high-level block diagram showing a generative adversarial network 400 used to generate a replica screenshot 418. As shown, a generator 412 of the generative adversarial network 400 may receive as inputs one or more of wireframes 402 of the augmented reality interface, a language preference 404 of the augmented reality interface, device dimensions 406 on which the augmented reality interface is displayed, relevant system preferences 408 of the device on which the augmented reality interface is displayed, and mockups 410 of the augmented reality interface. These inputs may be used by the generator 412 to create a replica screenshot 418 of the augmented reality interface. By contrast, an actual screenshot 416 of the augmented reality interface may be created by taking a snapshot of the user interface of a device 414.

A discriminator 420 may be configured to distinguish between the actual and replica screenshots 416, 418. The discriminator 420 may take as input either a real screenshot 416 from the device 414 or a generated screenshot 418 from the generator 412 and output a probability or indication that the screenshot is real. The purpose of the discriminator 420 is to correctly identify whether the screenshot is real or simulated. The discriminator loss 422 measures how well the discriminator 420 is able to distinguish between the two types of screenshots. Based on the discriminator loss 422, back propagation may be used to update parameters of the discriminator 420 to minimize the discriminator loss 422.

Similarly, the generator loss 424 may indicate how well the generator 412 is performing in creating replica screenshots 418 that resemble the actual screenshots 416. Back propagation based on the generator loss 424 may be used to update parameters of the generator 412 to minimize the generator loss 424. This improves the ability of the generator 412 to generate replica screenshots 418 that are as indistinguishable as possible from the actual screenshots 416. The back propagation of the generator 412 and the discriminator 420 is performed iteratively to continuously improve the performance of the generative adversarial network 400.

Figure 5:
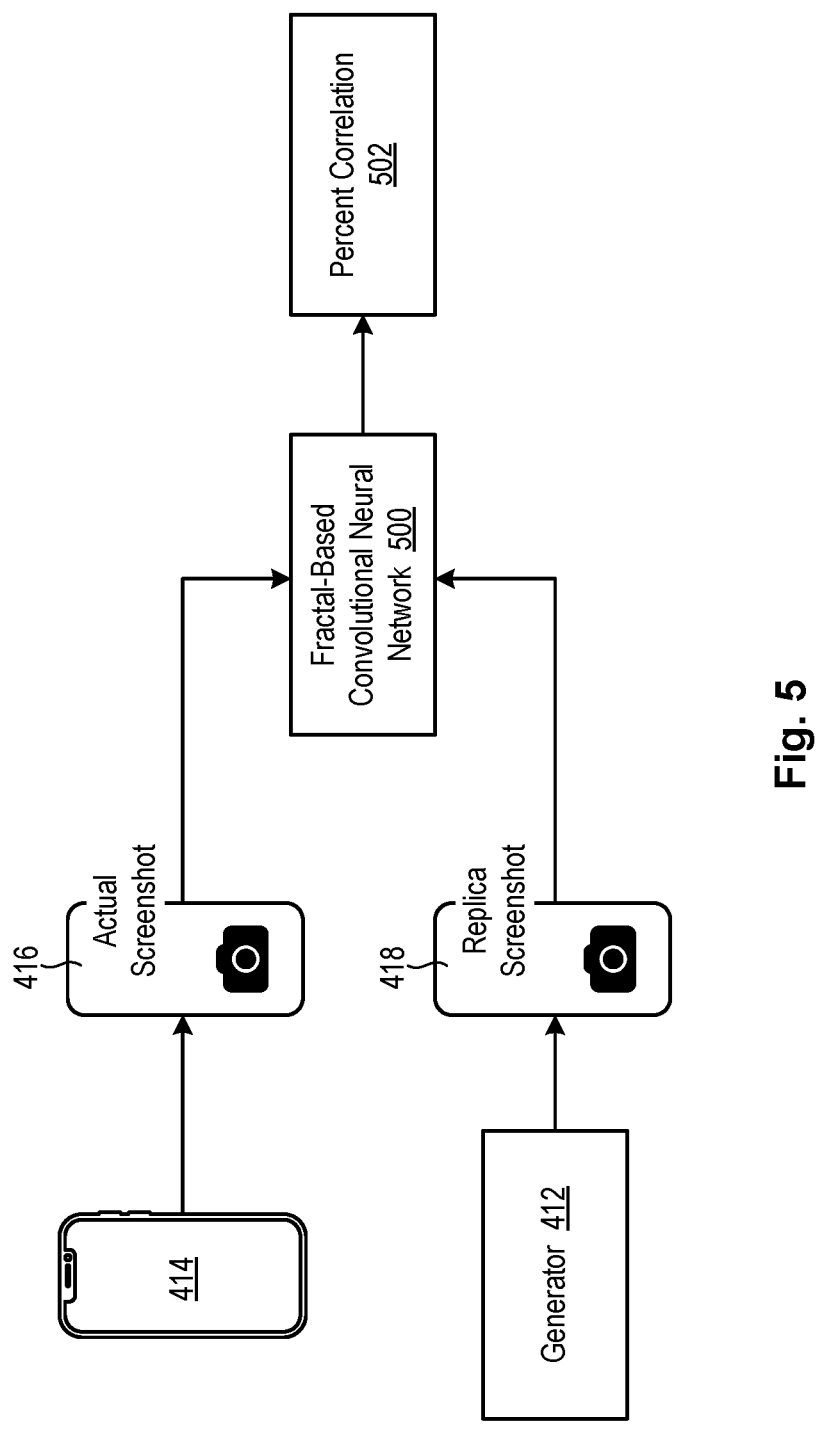
FIG. 5 is a high-level block diagram showing inputting of the actual screenshot and the replica screenshot into a fractal-based convolution neural network to determine a correlation between the actual screenshot and the replica screenshot.

Referring to FIG. 5, the replica screenshot 418 and actual screenshot 416 of the augmented reality interface may be input to a fractal-based convolutional neural network 500 to determine a correlation, such as a percent correlation 502, between the two screenshots 416, 418. The percent correlation 502 may be compared against a threshold to determine whether the augmented reality interface is error free or, conversely, if the augmented reality interface contains one or more potential conflation errors. If the percent correlation 502 causes the augmented reality interface to get flagged by a threshold algorithm as potentially containing a conflation error, the augmented reality interface may then be sent to another algorithm to determine more details related to the conflation issue. Once the root of the issue has been identified, the augmented reality interface may be flagged as erroneous or faulty so that the conflation issue can be addressed.

Figure 6:
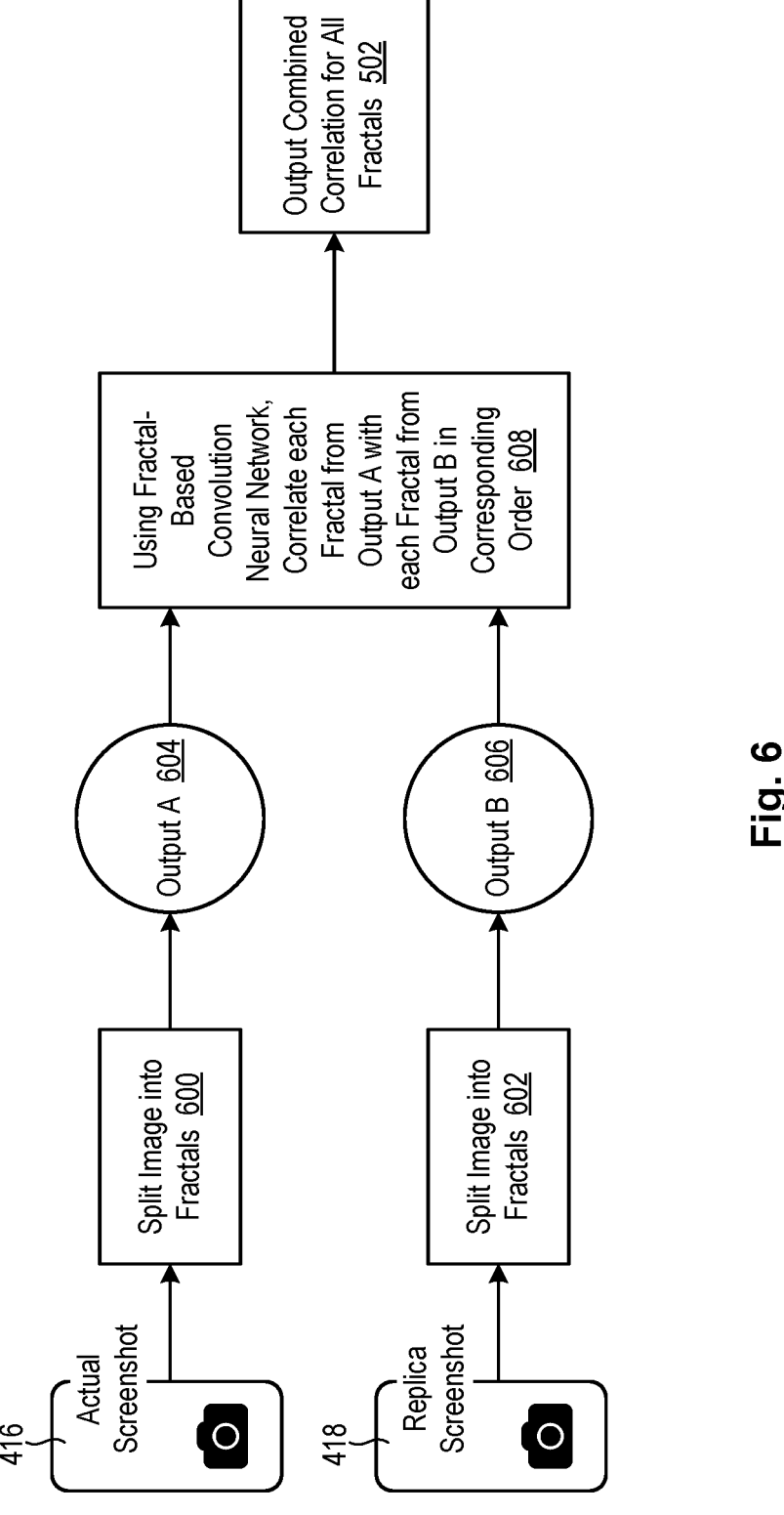
FIG. 6 is a high-level block diagram showing the process of FIG. 5 at a fractal level.

FIG. 6 is a high-level block diagram showing the process of FIG. 5 at a fractal level. As shown, the actual screenshot 416 and replica screenshot 418 are each split 600, 602 into N fractals to generate outputs 604, 606. Using a fractal-based convolutional neural network 500, each fractal of the actual screenshot 416 is correlated 608 in order with each fractal of the replica screenshot 418. A percent correlation may be calculated for each fractal and then each of these percent correlations may be combined into an overall percent correlation 502. A lower overall percent correlation 502 may indicate that a conflation error exists in the augmented reality interface.

Figure 7A:
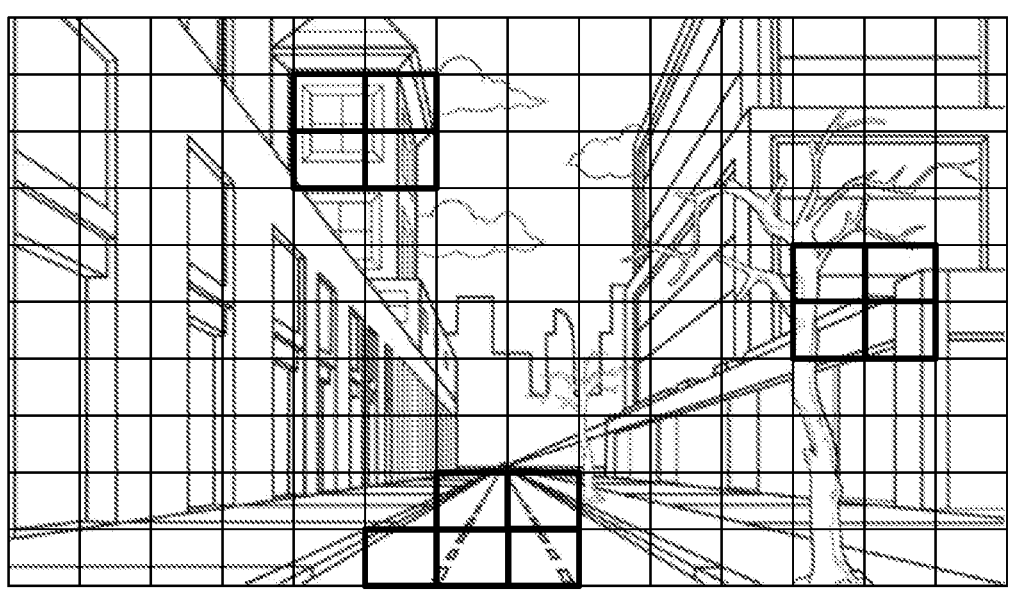
FIGS. 7A and 7B show two exemplary images that may be processed by the system of FIG. 6, and further showing differences between fractals in the images.
Figure 7B:
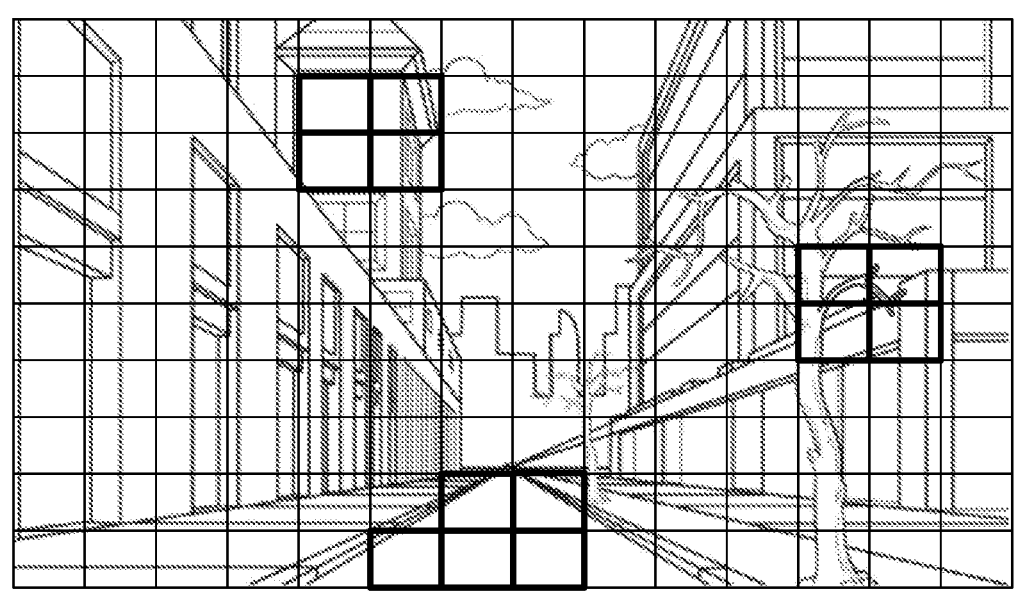

FIGS. 7A and 7B show two exemplary images (e.g., screenshots 416, 418) that may checked for conflation errors by a process such as that illustrated in FIGS. 5 and 6. One image 700a may be an actual (i.e., real) image 700a while the other image 700b may be a replica image 700b generated by a generative adversarial network 400. As shown, the images 700a, 700b may be divided into N fractals as indicated by the grid pattern overlaid on each of the images 700a, 700b. Each of these images 700a, 700b may be input to the fractal-based convolutional neural network 500 to determine a correlation, such as a percent correlation 502, between the two images 700a, 700b. Using the fractal-based convolutional neural network 500, each fractal of the image 700a is compared to each fractal 700b of the image 700b. As shown in FIGS. 7A and 7B, each image 700 is virtually identical except for the fractals within the bold outline. A percent correlation may then be calculated for each fractal and each of these correlations may be combined into an overall percent correlation 502. A lower overall percent correlation 502 may indicate that a conflation error exists in the real image 700a.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for detecting conflation errors in an augmented reality interface, the method comprising:

dividing the augmented reality interface into physical components and digital components to generate a set of appended encodings, wherein the generating the set of appended encodings comprises:

generating time-stamped physical and digital foundation model encodings based on, respectively, representations of the physical components and the digital components in the augmented reality interface;

generating time-stamped migration encodings based on migrating and/or exchanging the physical components and the digital components within the augmented reality interface; and generating time-stamped ablation encodings based on ablating the physical components and the digital components one at a time;

applying a conflation error classifier neural network to the set of appended encodings;

receiving an actual screenshot of the augmented reality interface;

generating, using a generative adversarial network (GAN) and based on inputs comprising the representations of the physical components and the digital components, a replica screenshot of the augmented reality interface indicating how the actual screenshot is expected to appear;

determining, via a fractal-based convolutional neural network (CNN), a correlation between the actual screenshot and the replica screenshot;

flagging the actual screenshot as having a potential conflation error in response to determining that the correlation is below a designated threshold; and determining a confidence of the potential conflation error based on a result of the applying the conflation error classifier.

2. The method of claim 1, wherein the conflation error involves conflating, in the augmented reality interface, a digital component for a physical component.

3. The method of claim 1, wherein the conflation error involves conflating, in the augmented reality interface, a physical component for a digital component.

4. The method of claim 1, wherein the replica screenshot indicates how the augmented reality interface is expected to appear when taking into account characteristics of a device on which the augmented reality interface is presented.

5. The method of claim 4, wherein the characteristics include at least one of screen size, language, notch dimensions, and operating system.

6. The method of claim 1, wherein the replica screenshot indicates how the augmented reality interface is expected to appear when taking into account design characteristics of the augmented reality interface.

7. The method of claim 1, wherein the correlation is represented as a percent correlation.

8. A computer program product for detecting conflation errors in an augmented reality interface, the computer program product comprising a computer-readable storage medium having computer-usable program code embodied therein, the computer-usable program code configured to perform the following when executed by at least one processor:

divide the augmented reality interface into physical components and digital components to generate a set of appended encodings, wherein the generating the set of appended encodings comprises:

generating time-stamped physical and digital foundation model encodings based on, respectively, representations of the physical components and the digital components in the augmented reality interface;

generating time-stamped migration encodings based on migrating and/or exchanging the physical components and the digital components within the augmented reality interface; and generating time-stamped ablation encodings based on ablating the physical components and the digital components one at a time;

apply a conflation error classifier neural network to the set of appended encodings;

receive an actual screenshot of the augmented reality interface;

generate, using a generative adversarial network (GAN) and based on inputs comprising the representations of the physical components and the digital components, a replica screenshot of the augmented reality interface indicating how the actual screenshot is expected to appear;

determine, via a fractal-based convolutional neural network (CNN), a correlation between the actual screenshot and the replica screenshot;

flag the actual screenshot as having a potential conflation error in response to determining that the correlation is below a designated threshold; and determine a confidence of the potential conflation error based on a result of the applying the conflation error classifier.

9. The computer program product of claim 8, wherein the conflation error involves conflating, in the augmented reality interface, a digital component for a physical component.

10. The computer program product of claim 8, wherein the conflation error involves conflating, in the augmented reality interface, a physical component for a digital component.

11. The computer program product of claim 8, wherein the replica screenshot indicates how the augmented reality interface is expected to appear when taking into account characteristics of a device on which the augmented reality interface is presented.

12. The computer program product of claim 11, wherein the characteristics include at least one of screen size, language, notch dimensions, and operating system.

13. The computer program product of claim 8, wherein the replica screenshot indicates how the augmented reality interface is expected to appear when taking into account design characteristics of the augmented reality interface.

14. The computer program product of claim 8, wherein the correlation is represented as a percent correlation.

15. A system for detecting conflation errors in an augmented reality interface, the system comprising:

at least one processor; and at least one memory device operably coupled to the at least one processor and storing instructions for execution on the at least one processor, the instructions causing the at least one processor to:

divide the augmented reality interface into physical components and digital components to generate a set of appended encodings, wherein the generating the set of appended encodings comprises:

generating time-stamped physical and digital foundation model encodings based on, respectively, representations of the physical components and the digital components in the augmented reality interface;

generating time-stamped migration encodings based on migrating and/or exchanging the physical components and the digital components within the augmented reality interface; and generating time-stamped ablation encodings based on ablating the physical components and the digital components one at a time;

apply a conflation error classifier neural network to the set of appended encodings;

receive an actual screenshot of the augmented reality interface;

generate, using a generative adversarial network (GAN) and based on inputs comprising the representations of the physical components and the digital components, a replica screenshot of the augmented reality interface indicating how the actual screenshot is expected to appear;

determine, via a fractal-based convolutional neural network (CNN), a correlation between the actual screenshot and the replica screenshot;

flag the actual screenshot as having a potential conflation error in response to determining that the correlation is below a designated threshold; and determine a confidence of the potential conflation error based on a result of the applying the conflation error classifier.

16. The system of claim 15, wherein the conflation error involves conflating, in the augmented reality interface, a digital component for a physical component.

17. The system of claim 15, wherein the conflation error involves conflating, in the augmented reality interface, a physical component for a digital component.

18. The system of claim 15, wherein the replica screenshot indicates how the augmented reality interface is expected to appear when taking into account characteristics of a device on which the augmented reality interface is presented.

19. The system of claim 18, wherein the characteristics include at least one of screen size, language, notch dimensions, and operating system.

20. The system of claim 15, wherein the replica screenshot indicates how the augmented reality interface is expected to appear when taking into account design characteristics of the augmented reality interface.

\* \* \* \* \*